United States Patent Office 3,525,916
Patented Aug. 25, 1970

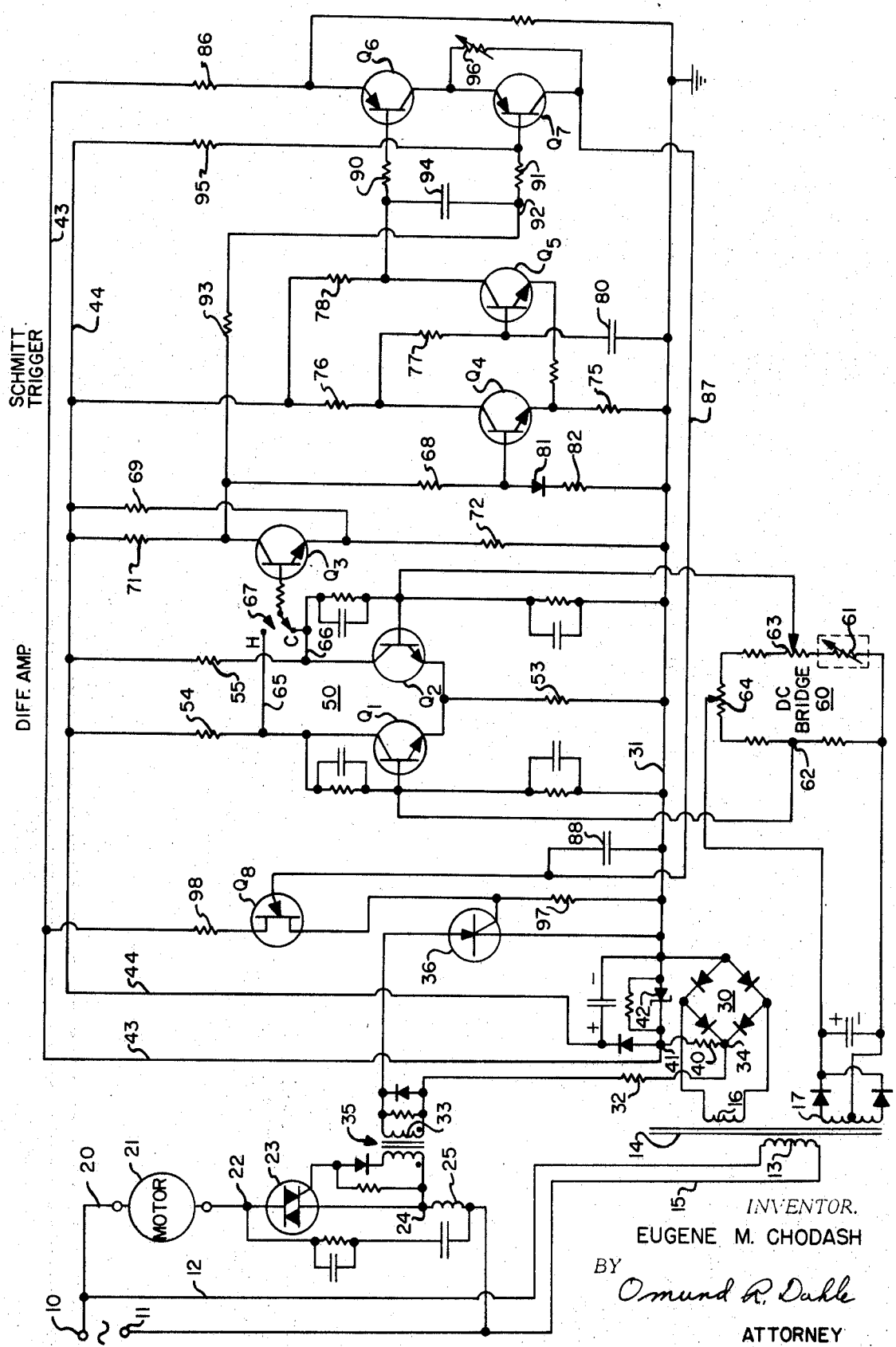

3,525,916
SOLID STATE MOTOR SPEED CONTROL
Eugene M. Chodash, Morton Grove, Ill., assignor to Honeywell Inc., Minneapolis, Minn., a corporation of Delaware
Filed June 30, 1967, Ser. No. 650,376
Int. Cl. H02p 7/58
U.S. Cl. 318—345                                                    4 Claims

ABSTRACT OF THE DISCLOSURE

A solid-state motor speed control having the firing angle of a gate controlled bidirectional current conducting semiconductor means, such as a Triac, controlled in response to a condition. In order to control the motor speed over a range from 50 percent of rated speed a special trigger circuit starts the motor at full speed and then almost immediately allows motor speed to drop back to the control point.

SUMMARY OF THE INVENTION

This invention comprises an improved phase-shift circuit for controlling the firing angle of a gate controlled bidirectional current conducting semiconductor means which controls the r.p.m. of a variable speed AC motor. It is desired to modulate motor speed between full speed and approximately 50 percent thereof and to preclude operation at a lower speed. It is desirable to avoid operation of the motor at less than 50 percent of rated speed because of bearing lubrication problems encountered at low speeds. In order to overcome the static friction of the motor, a full-speed starting pulse is applied initially and then motor speed is allowed to drop back to the controlled speed.

BRIEF DESCRIPTION OF THE DRAWING

The single figure of the drawing is an electrical schematic representation of the current of the invention.

DESCRIPTION

Referring now to the drawing there is disclosed a pair of power input terminals 10 and 11 adapted to be connected to a suitable source of AC power. Terminal 10 is connected by a conductor 12 to the upper extremity of a primary winding 13 of a power transformer 14, the lower extremity of the winding being connected by a conductor 15 to terminal 11. Transformer 14 has a plurality of secondary windings including a winding 16 and a center tapped winding 17. The output of each of these windings is rectified to provide separate DC supplies to be discussed further below.

Power terminal 10 is also connected by a conductor 20 to the upper terminal of a variable speed AC motor 21, such as a shaded-pole type or a permanent split-capacitor type. The lower terminal of the motor is connected through a junction 22, a gate controlled bidirectional current conducting semiconductor means 23, a junction 24, a choke coil 25, and the conductor 15 to power terminal 11. The gate controlled semiconductor means 23 is shown as a Triac capable of conducting current in both directions upon the application of a gate pulse to the device along with the proper application of a potential to the current carrying terminals. The switch current control means known as a Triac is well known in the art and will not be described in further detail.

Winding 16 is connected to the AC terminals of a full-wave rectifier 30. The DC terminals of the bridge 30 provide a multipurpose power supply with the negative terminal being connected to ground lead 31 and with the positive terminal being connected to a plurality of circuits to provide both pulsating DC power and filtered DC power. A first circuit may be traced from the positive terminal 34 of rectifier 30 through a dropping resistor 32, primary winding 33 of a pulse transformer 35 and through the anode-cathode circuit of a controlled rectifier (SCR) 36 to ground 31. Pulse transformer 35 also includes a secondary winding which is connected in series with a diode between the gate electrode of Triac 23 and the junction 24. Full-wave rectified unfiltered pulses from rectifier 30 energize this circuit.

A further circuit may be traced from terminal 34 through a dropping resistor 40, a junction 41, and a voltage reference element 42, such as a Zener diode, to ground 31. Full-wave rectified pulses having clipped tops are thus available at junction 41 and conductor 43 for purposes to be discussed further below. A filtered DC supply is also obtained by a conventional filter network including a diode and a shunting filter capacitor interconnecting junction 41 to a positive supply lead 44.

A differential amplifier 50 comprises a pair of N-P-N transistors Q1 and Q2 which have their emitter electrodes connected to ground through a common resistor 53. The collector of transistor Q1 is connected to positive source lead 44 through a collector load resistor 54, and the collector electrode of transistor Q2 is similarly connected by a resistor 55. The base bias circuits for the transistors Q1 and Q2 are conventional with a resistor from collector to base and another from base to ground. These resistors may be paralleled by bypass capacitors.

A condition responsive DC bridge 60 provides the signal into the differential amplifier base electrodes. The condition responsive sensing element 61 is shown herein as a temperature sensitive resistor such as a NTC thermistor. The first output terminal 62 of the bridge is connected to the base of transistor Q1, and the wiper of setpoint potentiometer 63 provides the other bridge output and is connected to transistor Q2. A potentiometer 64 of the bridge output and is connected to transistor Q2. A potentiometer 64 of the bridge 60 provides for balancing of the differential amplifiers. A pair of output conductors 65 and 66 respectively, connect the collectors of transistors Q1 and Q2 to terminals H and C of a single-pole, double-throw switch 67.

The opposite outputs from the differential amplifier, as selected by heat-cool changeover switch 67, are fed into the base of a transistor amplifier stage Q3. A resistor 71 connects the conductor 44 to the collector electrode of the N-P-N transistor Q3. A resistor 72 connects the emitter electrode to ground. A further resistor 69 parallels resistor 71 and transistor Q3. The output of amplifier Q3 is taken from the collector electrode and coupled through a resistor 68 into a Schmitt trigger comprising a pair of transistors Q4 and Q5. The Schmitt trigger transistors have a common emitter resistor 75 connected to ground. The collector of transistor Q4 is connected by a resistor 76 to conductor 44 and by a resistor 77 to the base of transistor Q5. The collector of transistor Q5 is connected to a conductor 44 by a resistor 78 and the base is connected to ground through a capacitor 80. The input of the Schmitt trigger at the base of transistor Q4 is connected through a diode 81 and a resistor 82 to ground.

The output from the amplifier Q3 and the output from the Schmitt trigger is fed to the actual trigger circuits for the Triac, which comprises a pair of P-N-P transistors Q6 and Q7, a unijunction transistor Q8, the SCR 36, and related components. A circuit may be traced from the conductor 43 through a resistor 86, the transistor Q6 from emitter to collector, the transistor Q7 from emitter to collector, conductor 87 and capacitor 88 to ground. The base electrode of transistor Q6 is connected by a resistor 90 to the collector of transistor Q5, and the base of transistor Q7 is connected by a resistor 91, a junction 92, and a resistor 93 to the collector of transistor Q3. A capacitor 94 interconnects the collector of transistor Q5 to the junction 92. A further bias is connected from the conductor 44 through a bias resistor 95 to the base of transistor Q7. A variable resistor 96 is connected in parallel with the emitter-collector of transistor Q7.

The conductor 87 is also connected to the emitter electrode of unijunction transistor Q8. The first base electrode is directly connected to the gate electrode of SCR 36 and is further connected by a resistor 97 to ground. Base two of the unijunction is connected by a resistor 98 to the conductor 43.

OPERATION

Considering now the theory of operation of the temperature regulated motor speed control, it should be restated that the primary control element in this circuit is the Triac 23. This device behaves like back-to-back silicon-controlled rectifiers. That is, the device is normally in the off or non-conducting stage until it is triggered by a gate pulse at which time the device is turned on and appears like a forward biased diode in series with the motor 21. The Triac will then remain on until the current through the device falls below a certain prescribed level. At that point, the Triac will turn off and remain off until it is triggered by another pulse in the succeeding half cycle. The Triac is triggered on during each half cycle that the motor is running and the point or phase angle on the sine wave at which the Triac is triggered is a function of the sensed condition. By controlling the phase angle, the average power applied to the motor is controlled and therefore the motor speed is controlled.

The remaining portion of the circuit to be discussed below operates as a temperature sensitive trigger circuit for the Triac. The power input transformer 14 has secondary windings 16 and 17, the output of winding 17 being rectified and filtered to provide a DC voltage for the bridge 60. The winding 16 is rectified and provides DC on conductor 44, unfiltered but clipped DC pulses on conductor 43 and full-wave rectified unfiltered DC voltage at terminal 34.

The output from the temperature responsive bridge circuit 60 provides a signal into the differential amplifier 50. The differential amplifier 50 has two symmetrical outputs of different polarities so that this speed control may be used for regulating the motor speed in either a "heating" or "cooling" mode by use of the single-pole, double-throw changeover switch 67, which allows the selection of the desired polarity of signal. The voltages at the output of the differential amplifier can be initially balanced by adjustment of potentiometer 64 in the bridge circuit. The temperature sensing element 61, which has a negative temperature coefficient (NTC) operates so that an increase in temperature will cause a corresponding decrease in the resistance of the sensing element which in turn will cause a corresponding increase in the collector voltage of transistor Q2 and a decrease in the collector voltage of transistor Q1.

Assuming the switch 67 is in the cooling position, that is, connecting the base of transistor Q3 to the collector of transistor Q2, it can be seen that transistor Q3 is initially biased off for all temperatures below the initial temperature. As temperature increases and the voltage on the collector of transistor Q2 increases in a positive-going direction, the transistor Q3 is turned on and its collector voltage begins to decrease. The output from the collector of transistor Q3 is coupled to the Schmitt trigger and is also coupled to the base of transistor Q7 to control its degree of conductivity. In the off state of the Schmitt trigger, transistor Q4 is normally conducting and the transistor Q5 is normally cut off. The collector of transistor Q5 is directly coupled to the base of switching transistor Q6. When transistor Q5 is cut off, transistor Q6 is also cut off. Conversely, when transistor Q5 is turned on, transistor Q6 is saturated. As the collector of transistor Q3 begins to decrease in voltage, a level is reached at which it triggers the Schmitt trigger circuit into the conducting state, that is, with transistor Q5 turned on.

The actual trigger circuit for the Triac 23 is comprised of the unijunction transistor Q8, the capacitor 88, the transistors Q6 and Q7, the SCR 36, and the pulse transformer 35. As long as the switching transistor Q6 is cut off, no charging current is available to the capacitor 88; and therefore, the unijunction transistor Q8 is not fired. When the Schmitt trigger operates so that transistor Q6 is turned on, two charging paths are connected to the capacitor 88. The first charging path may be traced from the clipped pulsating source on conductor 43 through resistor 86, switching transistor Q6, modulated transistor Q7, and then through the capacitor 88 to ground. The second path is through the variable resistor 96, which is in parallel with transistor Q7, this resistor 96 being adjusted to set the minimum speed at which the motor will be operated. It is effective to compensate for variation in the intrinsic standoff ratio of the unijunction transistor Q8 and variations in capacitance. The circuit parameters are chosen so that upon initial turn-on, and disregarding the startup pulse, the bias to transistor Q7 turns it only slightly on so that transistor Q7 is still a relatively high impedance and the majority of the charging current comes through the resistor 96. As the sensed temperature moves farther away from the desired set point (in this case, as the temperature seen by element 61 rises), the collector of transistor Q3 drops lower in voltage and the amount of current that is conducted through transistor Q7 is increased until it becomes the dominant charging path for the capacitor 88. The maximum speed of the motor is controlled by transistor Q7, therefor, and the minimum speed is controlled by the setting of resistor 96.

The capacitor 94, which is coupled from the collector of transistor Q5 to the resistor 91 feeding the base of transistor Q7 is used as a starting capacitor. When transistor Q5 is initially turned on, this capacitor couples the negative-going pulse to the base of transistor Q7 causing it to conduct heavily for a brief period of time, in the order of several seconds. This pulse has the effect of starting the motor at approximately full speed and letting it drop back to the minimum speed position as determined by the resistor 96. The full-speed starting pulse which occurs when the Schmitt trigger is initially turned on, is desirable to overcome the static friction of the motor.

Regardless of the charging path, each half cycle, the voltage on capacitor 88 rises toward the intrinsic standoff ratio of the unijunction transistor Q8, and at that point, the unijunction transistor conducts. The charge on the capacitor 88 is coupled to the resistor 97 in the base circuit of the unijunction. This pulse triggers the SCR 36 and allows current to flow in the primary 33 of the pulse transformer 35. This pulse is in turn coupled through the transformer to the gate of the Triac so that it is fired. This is repeated every half cycle. The frequency of the unijunction oscillator pulses is varied, i.e., the charging rate of capacitor 88, by the error signal introduced from the temperature bridge, and the variation in frequency of the oscillator in turn controls the firing angle of the Triac. Therefore, the larger the error signal from bridge 60, the earlier in the cycle the Triac fires and the faster the motor speed becomes.

As the temperature cools down toward the desired set point, the collector voltage of transistor Q2 becomes more positive which reduces the amount of current being conducted through transistor Q7 and slows down the motor. As the set point is reached, the Schmitt trigger changes from the on state to the off state, transistor Q5 is thus cut off, transistor Q6 is turned off, and the motor is again deenergized due to a lack of a trigger pulse from the unijunction circuit. The main function of the Schmitt trigger is to completely shut off the motor when the speed falls below 50 percent of full speed. The speed of the motor can be varied from 50 percent of full speed over a relatively small throttling range such as 3° F., for example.

The operation of the circuit in the heating mode (with switch 67 moved to the heating position) is the same except that since the circuit is now referenced to transistor Q1 instead of transistor Q2, the opposite response is obtained for a given change in condition.

I claim:

1. In a motor speed control apparatus for use with a variable speed motor and an alternating current source, the apparatus being of the phase control type in which the rate of charging of a capacitor in a unijunction transistor trigger circuit is controlled in response to an output signal representing a sensed condition, the improvement being in the charging circuit for said capacitor, the improvement comprising:

condition responsive means having an output signal of an amplitude which varies as a function of a sensed condition;

a switching transistor having control and output electrodes;

a modulated transistor having input and output electrodes;

a resistive-capacitive charging circuit comprising in series across a source of potential said switching transistor output electrodes, said modulated transistor output electrodes and said trigger circuit capacitor;

bistable circuit means operative from one to the other of two states in response to and dependent on the amplitude of said output signal which is connected thereto at said control electrode, said bistable circuit means having a predetermined threshold of signal amplitude at which the switching occurs;

means connecting the output of said bistable circuit means in controlling relation to said switching transistor;

and further transistor modulating means connecting said condition responsive output signal in controlling relation to the input of said modulated transistor whereby the conductivity of said transistor is varied as a function of said output signal amplitude so that the switching transistor and the modulating transistor cooperate in the control of the charging of the trigger capacitor.

2. The invention in accordance with claim 1, and further comprising; motor starting means comprising pulse transmitting means including a further capacitor coupling said bistable circuit means output to said modulated transistor input to provide a pulse to temporarily augment the condition responsive signal to said modulated transistor and temporarily render it fully conductive at the same time said bistable circuit means turns on said switching transistor.

3. The invention in accordance with claim 1, in which said bistable circuit means is a Schmitt trigger circuit.

4. The invention in accordance with claim 2, in which said pulse is effective for a period in the order of several seconds.

References Cited

UNITED STATES PATENTS

| 3,064,175 | 11/1962 | Vergez | 318—341 |
| 3,213,343 | 10/1965 | Sheheen | 318—341 |
| 3,095,530 | 6/1963 | Woodward | 318—341 X |
| 3,281,073 | 10/1966 | Chou | 307—310 X |
| 3,331,139 | 7/1967 | Finnegan | 307—252 X |

OTHER REFERENCES

Gutzwiller, F. W., and Howell, E. K.: Economy Power Semiconductor Applications, General Electric, March 1965.

ORIS L. RADER, Primary Examiner

A. G. COLLINS, Assistant Examiner

U.S. Cl. X.R.

318—341, 430, 471